United States Patent
Jafek (10) Patent No.: US 11,893,743 B2
(45) Date of Patent: Feb. 6, 2024

(54) SKY SEGMENTOR USING CANNY LINES

(71) Applicant: Aurora Flight Sciences Corporation, Manassas, VA (US)

(72) Inventor: Benjamin Jafek, Somerville, MA (US)

(73) Assignee: AURORA FLIGHT SCIENCES CORPORATION, Manassas, VA (US)

(*) Notice: Subject to any disclaimer, the term of this patent is extended or adjusted under 35 U.S.C. 154(b) by 447 days.

(21) Appl. No.: 17/227,050

(22) Filed: Apr. 9, 2021

(65) Prior Publication Data
US 2022/0012893 A1 Jan. 13, 2022

Related U.S. Application Data

(60) Provisional application No. 63/048,799, filed on Jul. 7, 2020.

(51) Int. Cl.
| | | |
|---|---|---|
| G06T 7/12 | (2017.01) |
| G06T 7/136 | (2017.01) |
| G06T 7/181 | (2017.01) |
| G06T 7/13 | (2017.01) |
| G06T 7/155 | (2017.01) |

(52) U.S. Cl.
CPC .......... *G06T 7/12* (2017.01); *G06T 7/13* (2017.01); *G06T 7/136* (2017.01); *G06T 7/155* (2017.01); *G06T 7/181* (2017.01); *G06T 2207/10032* (2013.01)

(58) Field of Classification Search
CPC .... G06T 7/10; G06T 7/12; G06T 7/13; G06T 7/181; G06T 2207/10032; G06T 7/136; G06T 7/155
See application file for complete search history.

(56) References Cited

U.S. PATENT DOCUMENTS

2021/0158041 A1* 5/2021 Chowdhary ......... G05D 1/0278

OTHER PUBLICATIONS

Ayadi, Mehdi, et al. "A parametric algorithm for skyline extraction." Advanced Concepts for Intelligent Vision Systems: 17th International Conference, ACIVS 2016, Lecce, Italy, Oct. 24-27, 2016, Proceedings 17. Springer International Publishing, 2016. (Year: 2016).*

Dusha, Damien, Wageeh Boles, and Rodney Walker. "Attitude estimation for a fixed-wing aircraft using horizon detection and optical flow." 9th Biennial Conference of the Australian Pattern Recognition Society on Digital Image Computing Techniques and Applications (DICTA 2007). IEEE, 2007. (Year: 2007).*

Laungrungthip, N., et al. "Edge-based detection of sky regions in images for solar exposure prediction." 2008 23rd International Conference Image and Vision Computing New Zealand. IEEE, 2008. (Year: 2008).*

(Continued)

*Primary Examiner* — Geoffrey E Summers
(74) *Attorney, Agent, or Firm* — MH2 Technology Law Group LLP (57) ABSTRACT

A method includes receiving a first image. The method also includes detecting a plurality of edges in the first image. The method also includes connecting the edges. The method also includes identifying a contour in the first image based at least partially upon the connected edges. The method also includes determining a convex hull of the contour. The method also includes generating a second image comprising the convex hull.

19 Claims, 7 Drawing Sheets

(56) References Cited

OTHER PUBLICATIONS

Lu, Jun-Wei, et al. "A Modified Canny Algorithm for Detecting Sky-Sea Line in Infrared Images." Intelligent Systems Design and Applications, International Conference on. vol. 2. IEEE Computer Society, 2006. (Year: 2006).*
Shen, Yu-Fei, et al. "A hierarchical horizon detection algorithm." IEEE Geoscience and Remote Sensing Letters 10.1 (2012): 111-114. (Year: 2012).*
Thompson, David R., et al. "Image processing onboard spacecraft for autonomous plume detection." Planetary and Space Science 62.1 (2012): 153-159. (Year: 2012).*
Chiu et al., "A Skyline Detection Algorithm for Use in Different Weather and Environmental Conditions," 2016 IEEE International Conference on Electro Information Technology (EIT), May 19, 2016, pp. 680-685.
Hashmani et al., "A Survey on Edge Detection based on recent Marine Horizon Line Detection Methods and their Applications," 2020 3rd International Conference on Computing, Mathematics and Engineering Technologies (ICOMET), IEEE, Jan. 29, 202, pp. 1-5.
Lu et al., "A Modified Canny Algorithm for Detecting Sky-Sea Line in Infrared Images," Intelligent Systems Design and Applications, 2006, IEEE, International Conference, pp. 289-294.
Extended European Search Report dated Oct. 1, 2021 in corresponding EP Application No. 21168617.5, 9 pages.
Dusha et al., "Attitude Estimation for a Fixed-Wing Aircraft Using Horizon Detection and Optical Flow," Digital Image Computing Techniques and Application, IEEE Computer Society, 2007, pp. 485-492.
Ettinger et al., "Towards Flight Autonomy: Vision-Based Horizon Detection for Micro Air Vehicles," ResearchGate.net, May 2002, 9 pages.
Fang et al., "The Study on an Application of Otsu Method in Canny Operator," Proceedings of the 2009 International Symposium on Information Processing, Aug. 2009, pp. 109-112.
He et al., "Deep Residual Learning for Image Recognition," Microsoft Research, arXiv:1512.03385v1[cs.CV] Dec. 2015, pp. 1-12.
La Place, "Segmenting Sky Pixels in Images," Jan. 2018, arXiv:1712.09161v2 [cs.CV], 11 pages.
McGee et al., "Obstacle Detection for Small Autonomous Aircraft Using Sky Segmentation," 2005, 4679-4684, 10.1109/Robot.2005.1570842.
Praczyk, "A Quick Algorithm for Horizon Line Detection in Marine Images," J. Mar. Sci. Technol, 2018, 23: 164-177.
Rosebrock, A., "Zero-parameter, automatic Canny edge detection with Python and OpenCV," pyimagesearch, 2015, 45 pages, https://www.pyimagesearch.com/2015/04/06/zero-parameter-automatic-canny-edge-detection-with-python-and-opencv/.

* cited by examiner

SKY SEGMENTOR USING CANNY LINES

CROSS-REFERENCE TO RELATED APPLICATIONS

This application claims priority to U.S. Provisional Patent Application No. 63/048,799, filed on Jul. 7, 2020, the entirety of which is incorporated by reference herein.

FIELD OF THE DISCLOSURE

The present disclosure is directed to sky segmentation. More particularly, the present disclosure is directed to performing sky segmentation on an image or video frame to help a vehicle determine the divide (e.g., horizon) between the ground and the sky for navigation purposes and/or to detect an object in the vehicle's field of view.

BACKGROUND

Sky segmentation uses a machine-learning model to associate pixels in an image or video frame with the sky. Sky segmentation methods are typically either edge-based or content-based. Edge-based sky segmentation methods do not produce a complete pixel-by-pixel sky segmentation. Rather, they conclude with finding a horizon line for micro air vehicle attitude estimation. Content-based sky segmentation methods require large amounts of pixel-by-pixel hand-labeled data, and they also have a high computational cost. In addition to the foregoing shortcomings, neither method works well with limited labeled data and real-time runtime constraints.

SUMMARY

A method is disclosed. The method includes receiving a first image. The method also includes detecting a plurality of edges in the first image. The method also includes connecting the edges. The method also includes identifying a contour in the first image based at least partially upon the connected edges. The method also includes determining a convex hull of the contour. The method also includes generating a second image comprising the convex hull.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving a first image. The first image is captured by a camera on an aircraft in flight. The operations also include detecting a plurality of edges in the first image based at least partially upon a threshold. The operations also include connecting the edges. The operations also include identifying a largest contour in the first image based at least partially upon the connected edges. The operations also include determining a convex hull of the largest contour. The convex hull represents a portion of a ground region in the first image. The operations also include generating a second image comprising the convex hull. A plurality of first pixels in the second image represent the convex hull, and a plurality of second pixels in the second image do not represent the convex hull.

In another example, the operations include receiving a first image. The first image is captured by a camera on a vehicle. The operations also include detecting a plurality of edges in the first image based at least partially upon a threshold. The operations also include connecting the edges. The edges are connected using morphological closing with a square kernel, and the morphological closing uses a kernel having an area from about 20 pixels to about 50 pixels. The operations also include identifying a largest contour in the first image based at least partially upon the connected edges. The largest contour includes a largest area. The operations also include determining a convex hull of the largest contour. The convex hull represents a portion of a ground region in the first image. The operations also include generating a second image including the convex hull. A plurality of first pixels having a first color in the second image represent the convex hull, and a plurality of second pixels having a second color in the second image do not represent the convex hull. The operations also include identifying a bottom-most first pixel in each column in the second image. The operations also include converting the second pixels that are below the bottom-most first pixel in each column to first pixels to produce a modified second image. The first pixels in the modified second image represent the ground region, and the second pixels in the modified second image represent a sky region. The operations also include combining at least a portion of the first image and at least a portion of the modified second image to produce a combined image.

BRIEF DESCRIPTION OF THE DRAWINGS

The accompanying drawings, which are incorporated in and constitute a part of this specification, illustrate aspects of the present teachings and together with the description, serve to explain the principles of the present teachings.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The systems and methods disclosed herein may identify/produce a boundary that approximates the separation between a ground region and a sky region in an image. The systems and methods may also mask out the non-sky (e.g., ground) region from the image to produce a sky background, which may minimize false positives of the boundary and/or detected objects. The system and methods disclosed herein may require no training data and run at or near real-time to generate a pixel-by-pixel sky segmentation map. Once the boundary has been detected, the system and method may use the boundary to help detect objects (e.g., other aircrafts, birds, etc.) and to navigate the aircraft to avoid such objects. The accuracy of the detection process may be enhanced by employing the sky segmentation technique described herein.

The systems and methods may quickly and accurately detect non-sky regions within an image which have a nonlinear border. In addition, the systems and methods do not require labeled data to train a machine-learning (ML) model. The systems and methods segment non-sky regions pixel-by-pixel, rather than by finding a horizon line and dividing the image into "above horizon" and "below horizon."

The camera may be fixed to the aircraft at a defined position relative to the aircraft with its field of view directed toward a region of interest (e.g., forward and/or in the direction that the aircraft is travelling). The sky regions may be entirely contained above non-sky regions. The non-sky regions may contain more edge sections than sky regions do. The sky and non-sky regions are separated by a horizon: a moderately straight line which traverses most to all of the width of the image. An example of the system and method may divide the image into sky and non-sky regions.

Figure 1:
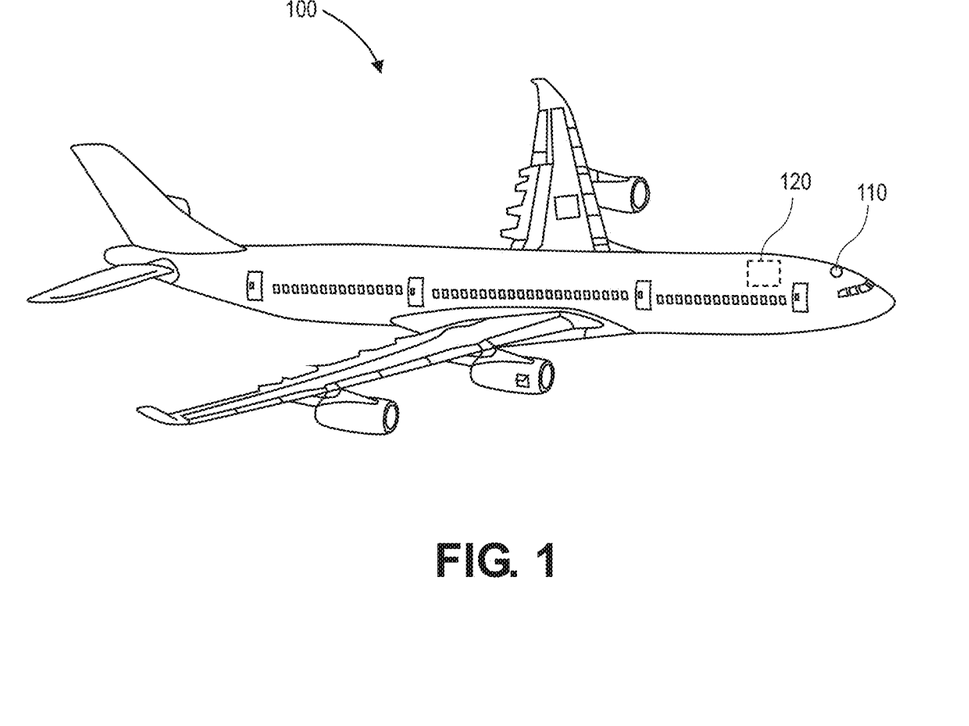
FIG. 1 illustrates a schematic view of an aircraft in flight, according to an example.

FIG. 1 illustrates a schematic view of an aircraft 100 in flight, according to an example. The aircraft 100 may be or include an airplane, a helicopter, an unmanned aerial vehicle (e.g., a drone), a spacecraft, or the like. The aircraft 100 may include a camera 110. The camera 110 may be coupled the aircraft 100 and/or positioned within the aircraft 100. The camera 110 may be configured to capture one or more images. The camera 110 may also or instead be configured to capture a video. In one example, the camera 110 may be configured to capture a continual stream of images over time (i.e. a video), and the images may be still frames taken from the video.

The images and/or video may be transmitted to a computing system 120 on the aircraft 100. In another example, the computing system 120 may be located on the ground (e.g., in a control station) in communication with an on-board computing system that is on/in the aircraft 100. The computing system 120 may include one or more processors and a memory system. The memory system may include one or more non-transitory computer-readable media storing instructions that, when executed by at least one of the one or more processors, cause the computing system 120 to perform operations. The operations are described with reference to FIG. 2 below.

Figure 2:
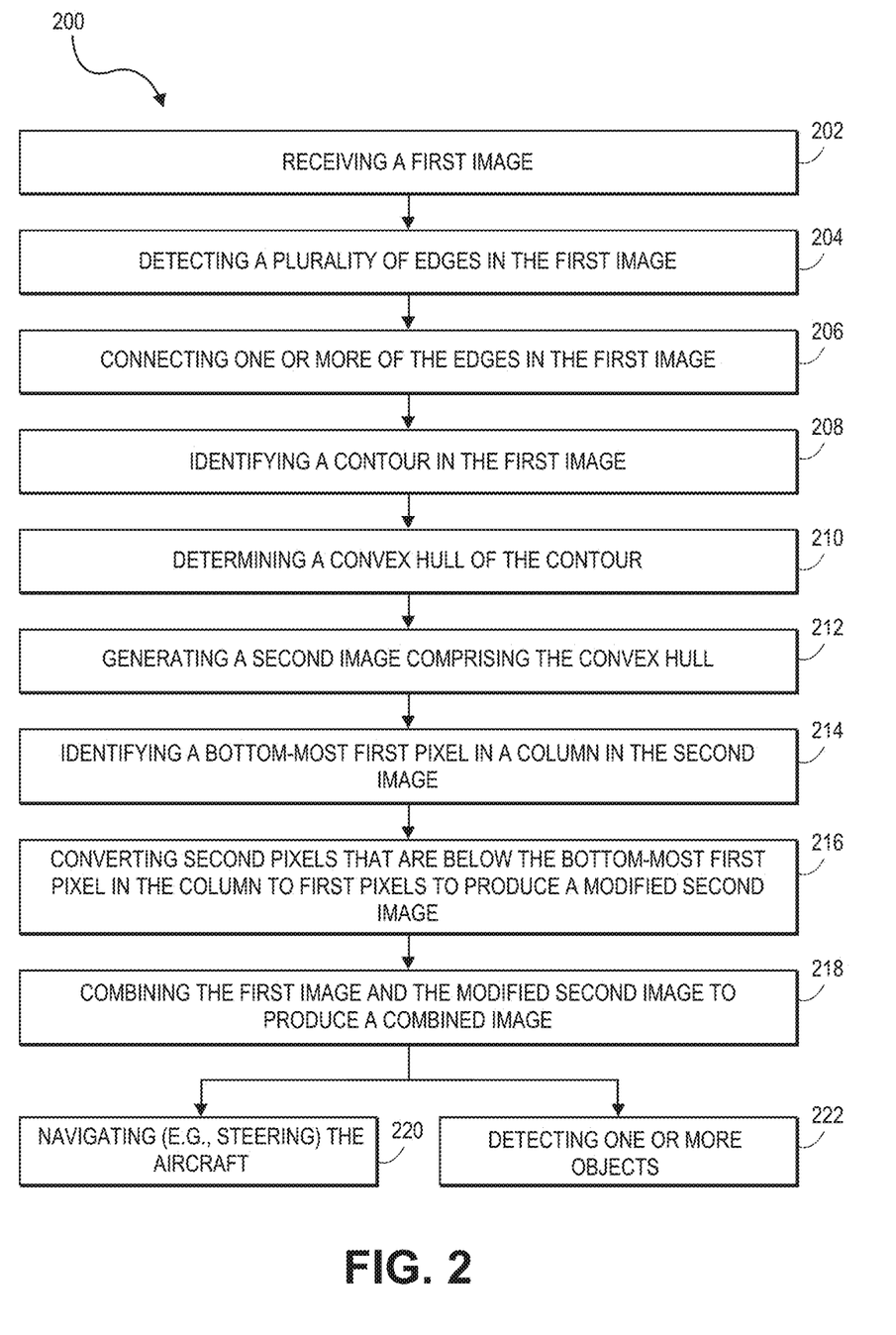
FIG. 2 illustrates a flowchart of a method for segmenting an image into a sky region and a ground region, according to an example.

FIG. 2 illustrates a flowchart of a method 200 for segmenting an image into a sky region and a ground region, according to an example. An illustrative order of the method 200 is described below. One or more steps of the method 200 may be performed in a different order, repeated, or omitted.

Figure 3:
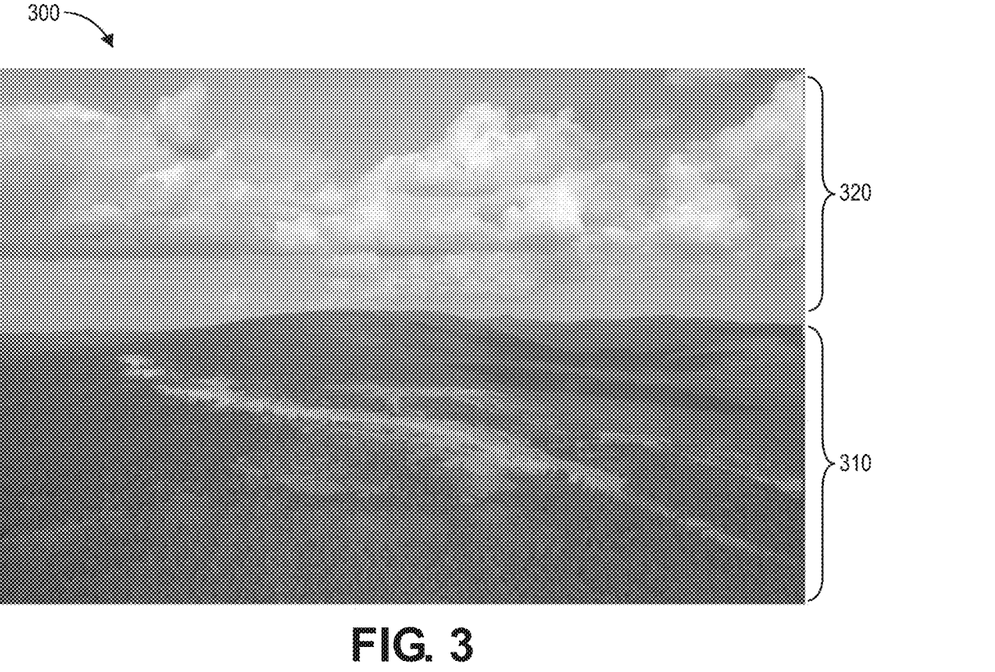
FIG. 3 illustrates a first image captured by a camera on the aircraft in flight, according to an example.

The method 200 may include receiving a first image, as at 202. An example of the first image 300 is shown in FIG. 3. The first image 300 may be received by the computing system 120. As mentioned above, the first image 300 may be captured by the camera 110. The camera 110 may be in an upright position and pointed forward such that the first image 300 includes a region of interest in the direction that the aircraft 100 is moving. Thus, the first image 300 may include at least a portion of the flight path of the aircraft 100. The first image 300 may include a ground region 310, a sky region 320, or both.

Figure 4:
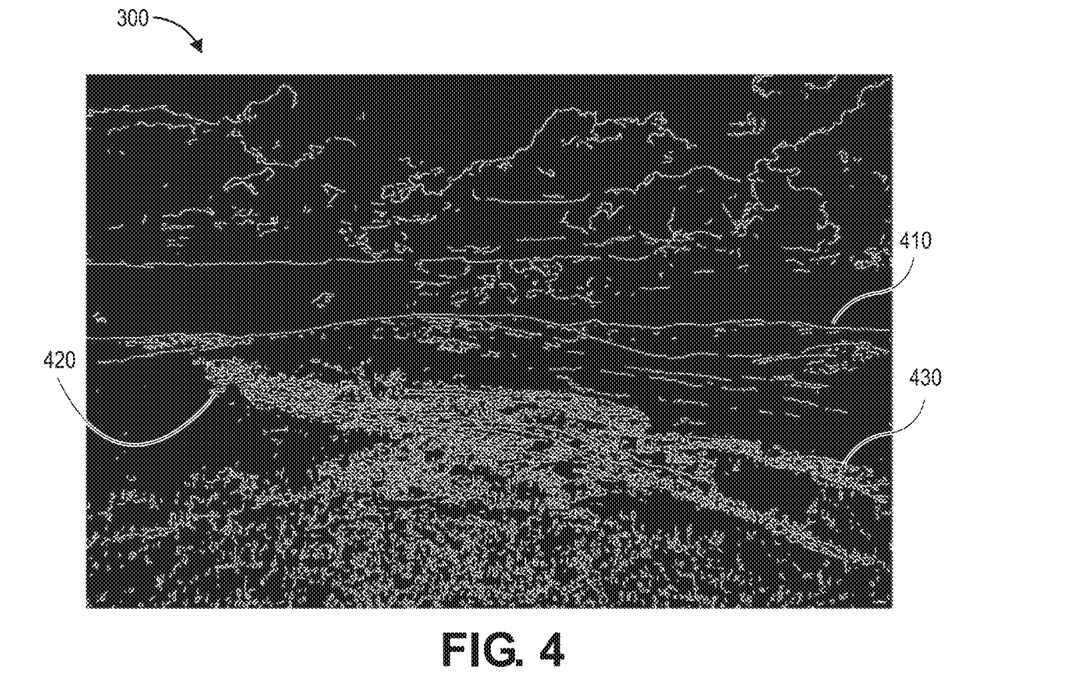
FIG. 4 illustrates the first image with a plurality of edges identified, according to an example.

The method 200 may also include detecting a plurality of edges (three are identified: 410, 420, 430) in the first image 300, as at 204. FIG. 4 shows the edges 410, 420, 430 detected/identified in the first image 300. As used herein, an "edge" refers to a point, set of points, or line (e.g., one or more pixels) in an image where the brightness changes sharply (e.g., by more than a predetermined threshold). Although the first image 300 includes more than three edges, for the sake of simplicity, only three are identified. This step may be performed by the computing system 120. More particularly, the computing system 120 may use canny edge detection (e.g., with low hysteresis parameters) or Laplacian edge detection methods to detect the edges 410, 420, 430 in the first image 300. In at least one example, the detection may be based at least partially upon a sensitivity threshold. For example, the sensitivity threshold may be increased (e.g., by a user) to detect more edges in the first image 300, or the sensitivity threshold may be decreased to detect fewer edges in the first image 300. In at least one example, the first image 300 may be binary, and pixels representing an edge 410, 420, 430 may have a value of zero, and pixels that do not represent an edge 410, 420, 430 may have a value of one, or vice versa.

Figure 5:
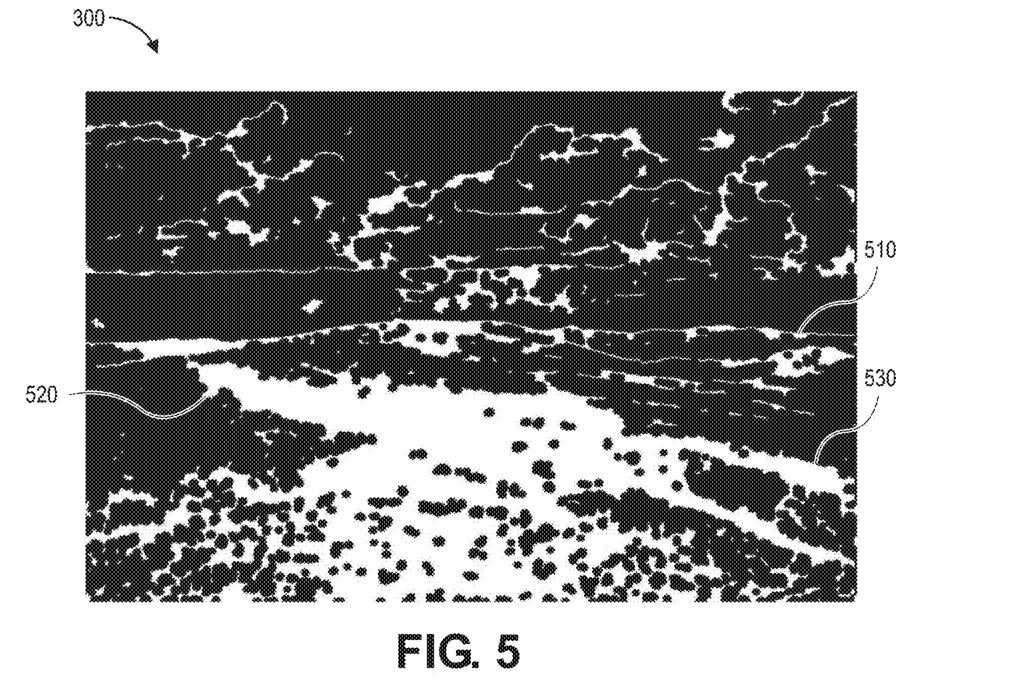
FIG. 5 illustrates the first image with the edges connected, according to an example.

The method 200 may also include connecting one or more of the edges 410, 420, 430 in the first image 300, as at 206. FIG. 5 shows the edges 410, 420, 430 (from FIG. 4) after being connected to produce connected edges 510, 520, 530. This step may be performed by the computing system 120. More particularly, the computing system 120 may use morphological closing to produce the connected edges 510, 520, 530. The morphological closing may use a kernel with an area from about 2 pixels to about 200 pixels, about 5 pixels to about 150 pixels, about 10 pixels to about 100 pixels, or about 20 pixels to about 50 pixels. The kernel may have a shape that is substantially a square, a rectangle, a triangle, a circle, an oval, an ellipse, or the like.

Figure 6:
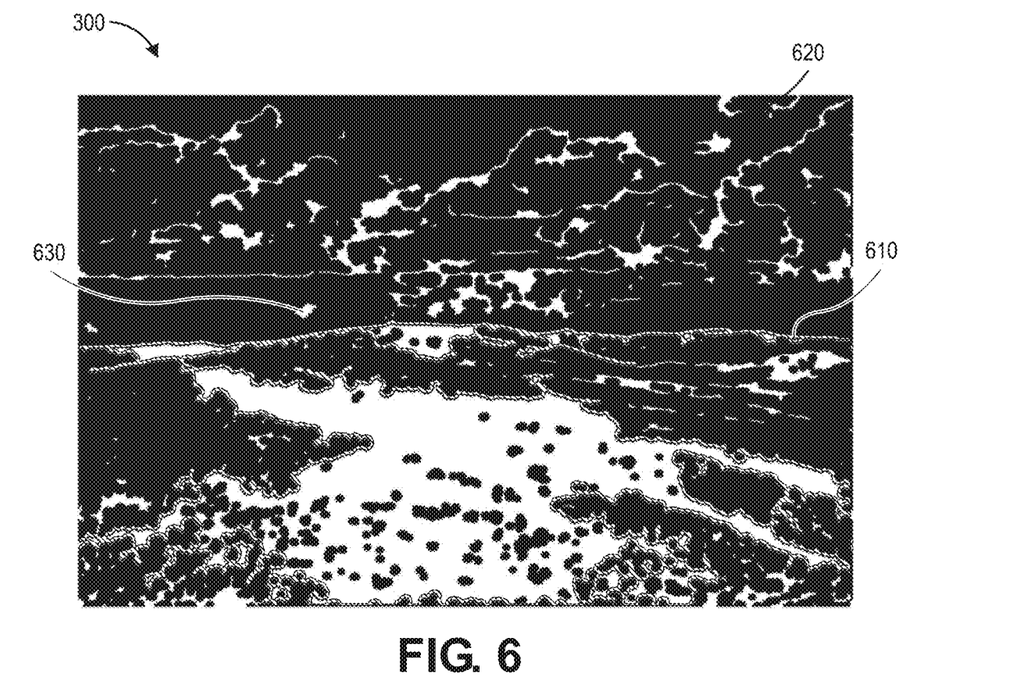
FIG. 6 illustrates the first image with a largest contour identified, according to an example.

The method 200 may also include identifying one or more contours (three are shown: 610, 620, 630) in the first image 300, as at 208. FIG. 6 shows the contours 610, 620, 630 in the first image 300. This step may be performed by the computing system 120. The contours 610, 620, 630 may be identified based at least partially upon the connected edges. For example, the contours 610, 620, 630 may each have an uninterrupted perimeter that is defined by the connected edges. In an example, the first image 300 may include a plurality of contours 610, 620, 630, and this step may include identifying the largest contour 610, which is outlined with a hatching pattern to be seen more clearly. The largest contour 610 may be or include the contour with the most pixels (e.g., the largest area).

Figure 7:
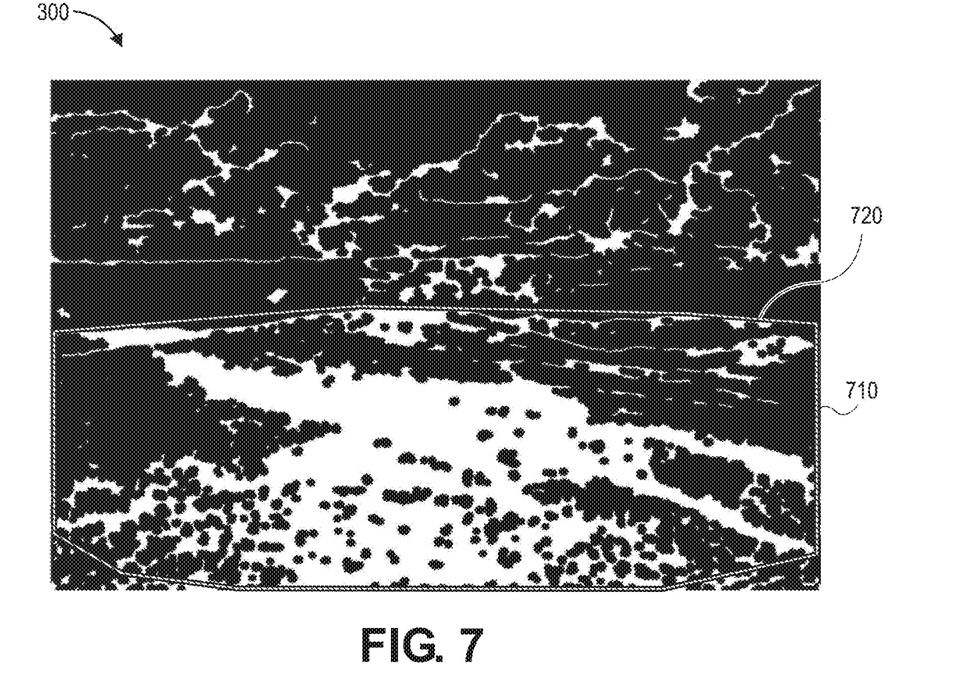
FIG. 7 illustrates the first image with a convex hull identified, according to an example.

The method 200 may also include determining a convex hull 710 of the (e.g., largest) contour 610, as at 210. FIG. 7 shows the convex hull 710 of the contour 610. This step may be performed by the computing system 120. The convex hull 710 is outlined with a hatching pattern to demonstrate and describe the step 210. In practice, such hatching may or may not be used. As used herein, a "convex hull" refers to the smallest convex shape that (e.g., entirely) surrounds another shape (e.g., the contour 610). Thus, no line can be drawn from a first point inside of the shape to a second point inside of the shape that at some point along the line falls outside of the shape. The convex hull 710 represents a portion of the ground region 310 in the first image 300. The top 720 of the convex hull 710 may represent the horizon (e.g., between the ground region 310 and the sky region 320).

Figure 8:
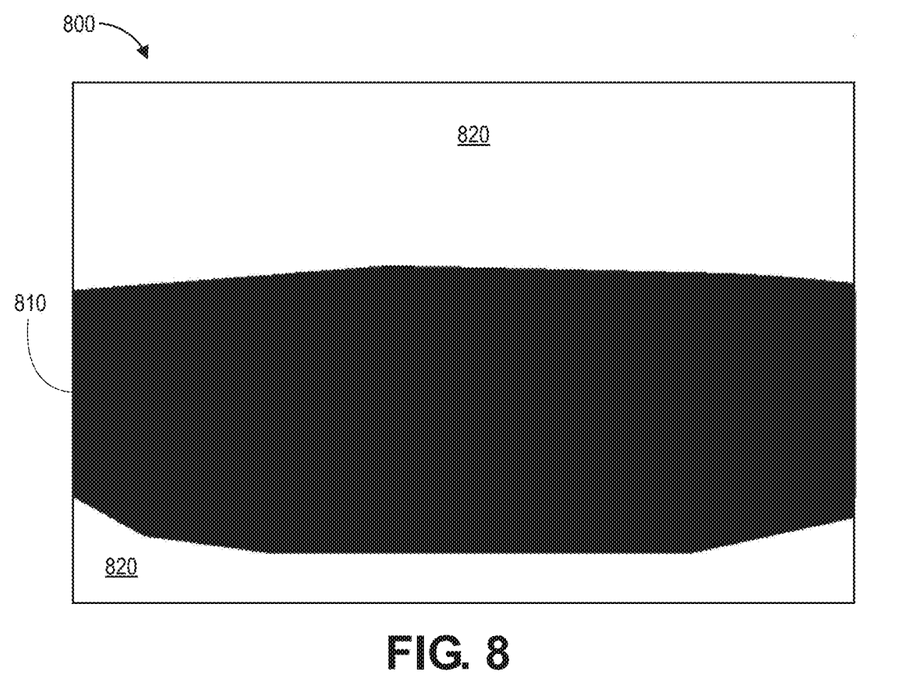
FIG. 8 illustrates a second image including a plurality of first pixels (e.g., black pixels) representing the convex hull, according to an example.

The method 200 may also include generating a second image 800, which includes the convex hull 710, as at 212. Alternatively, the first image 300 may be modified to produce the second image 900, which includes the convex hull 710. FIG. 8 shows the second image 800, which includes the convex hull 710. This step may be performed by the computing system 120. The second image 800 may include a plurality of first (e.g., black) pixels 810 and a plurality of second (e.g., white) pixels 820. The first pixels 810 may represent the convex hull 710, which represents at least a part of the ground region 310. The second pixels 820 do not represent the convex hull 710. Instead, at least a portion of the second pixels 820 may represent the sky region 320. For example, the second pixels 820 that are above the first pixels 810 may represent the sky region 320. However, as may be seen, some of the second pixels 820 are below the first pixels 810. As the sky region 320 cannot be below the ground region 310, this is corrected below.

Figure 9:
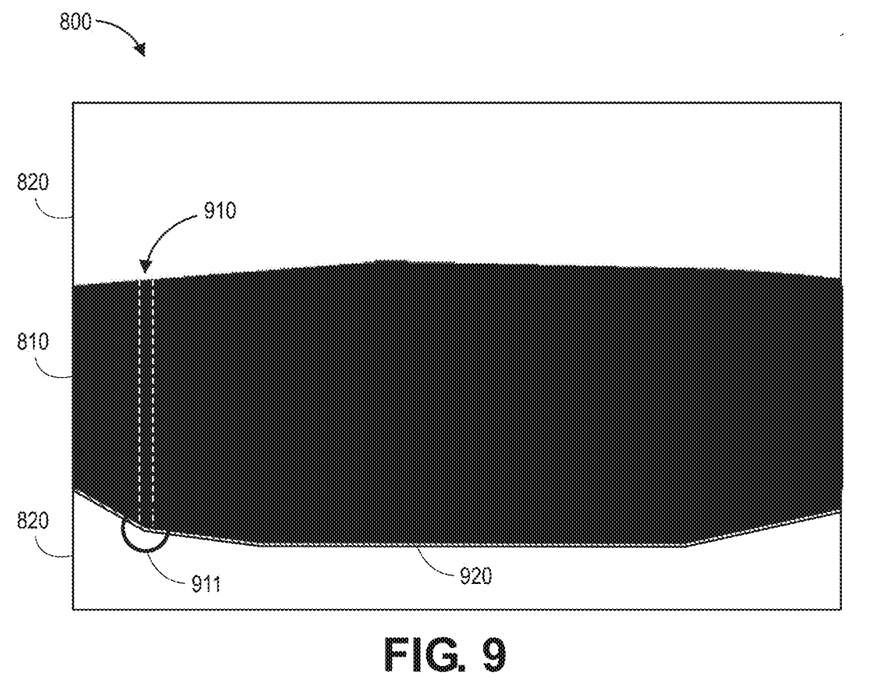
FIG. 9 illustrates the second image with a bottom-most first pixel (e.g., the bottom-most black pixel) identified in each column, according to an example.

The method 200 may also include identifying a bottom-most first pixel 911 in a column 910 in the second image 800, as at 214. This is shown in FIG. 9. This step may be performed by the computing system 120. This step may be repeated for each column in the second image 800. This may yield a bottom-most layer 920 of first pixels 810 in the second image 800. The bottom-most layer 920 is outlined with a hatching pattern to be seen more clearly.

Figure 10:
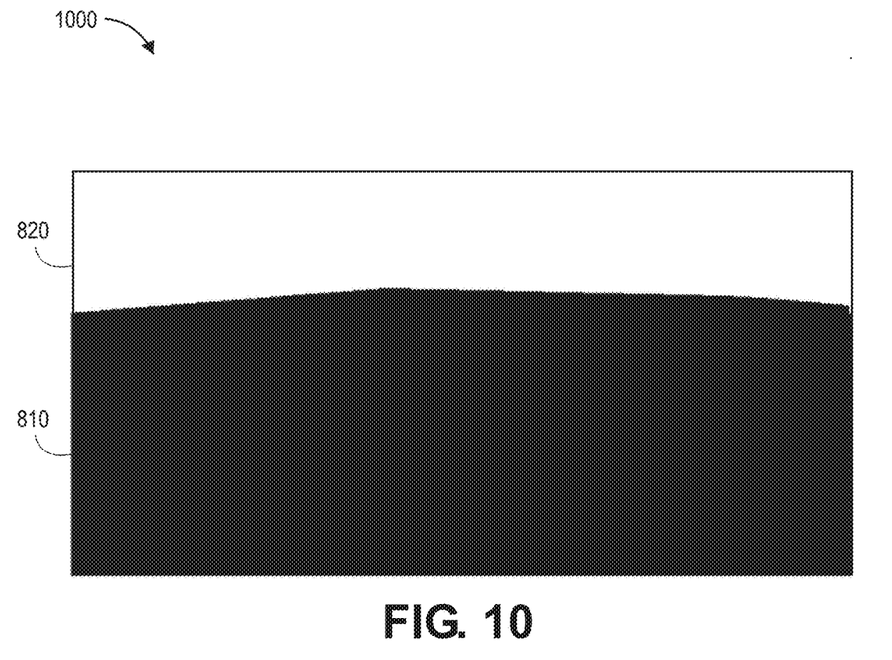
FIG. 10 illustrates the second image with second pixels (e.g., white pixels) below the bottom-most first pixel (the bottom-most black pixel) converted to first pixels (e.g., black pixels) to produce a modified second image, according to an example.

The method 200 may also include converting the second pixels 820 that are below the bottom-most first pixel 911 in the column 910 to first pixels 810 to produce a modified second image 1000, as at 216. This is shown in FIG. 10. This step may be performed by the computing system 120. This corrects the issue noted above. Now, the first pixels 810 represent the ground region 310, and the second pixels 820 represent the sky region 320. There is no longer a portion of the sky region 320 that is positioned below the ground region 310. The modified second image 1000 may be or include a sky mask. As used herein, a "sky mask" refers to a binary image where "false" (e.g., 0) values indicate ground pixels and "true" (e.g., 1) values indicate sky pixels.

Figure 11:
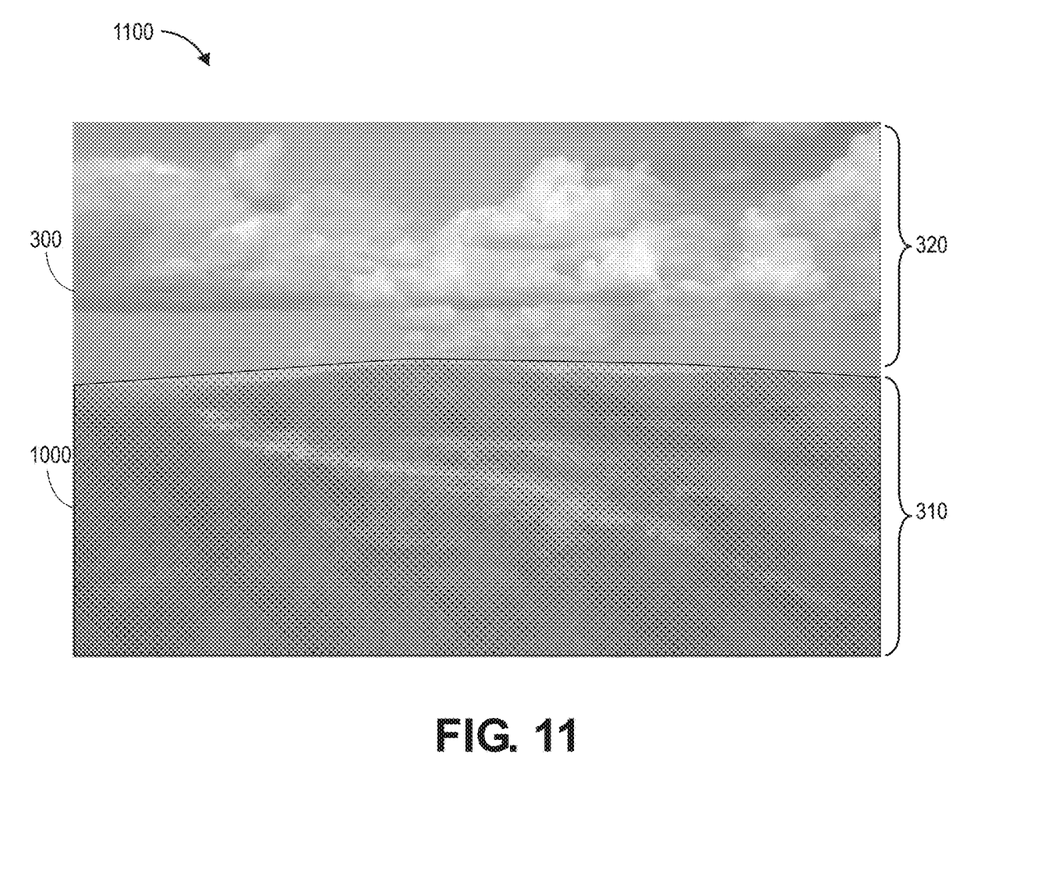
FIG. 11 illustrates a combined image that includes the modified second image overlaid onto the first image, according to an example.

In an example, the method 200 may also include combining the first image 300 and at least a portion of the modified second image 1000 to produce a combined image 1100, as at 218. This is shown in FIG. 11. This step may be performed by the computing system 120. In at least one example, this may include overlaying at least a portion of the modified second image 1000 on the first image 300 to produce the combined image 1100. The portion of the modified second image 1000 that is overlaid substantially corresponds to the ground region 310 in the first image 300. As shown, the portion of the modified second image 1000 may be transparent or opaque such that the first image 300 underneath may be seen. In FIG. 11, the portion of the modified second image 1000 is hatched to be seen more clearly. In another example, the portion of the modified second image 1000 may be solid such that the first image 300 underneath may not be seen. In yet another example, this step may be omitted.

The method 200 may also include navigating (e.g., steering) the aircraft 100, as at 220. The aircraft 100 may be navigated (e.g., steered) based at least partially upon the second image 800, the modified second image 1000, the combined image 1100, or a combination thereof. The navigation may be performed (e.g., automatically) by the computing system 120. In another example, the navigation may be performed by a user. The user may be in the aircraft 100 (e.g., a pilot), or the user may be on the ground and steering the aircraft 100 remotely.

In another example, the method 200 may also or instead include detecting one or more objects, as at 222. This step may be performed by the computing system 120. The objects may be detected based at least partially upon the second image 800, the modified second image 1000, the combined image 1100, or a combination thereof. For example, the second image 800, the modified second image 1000, and/or the combined image 1100 may be used as an input into a path-planning or object detection algorithm. The object detection algorithm may more accurately detect objects and/or detect objects with fewer false positives when the image is segmented into the sky and non-sky regions, which enables detection of the objects above the horizon (e.g., in the sky region). The objects detected may be or include moving objects. For example, the objects may be or include other aircrafts in flight, and the aircraft 100 may be navigated in response to (e.g., to avoid) the other aircrafts in flight.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the terms "bonded" and "bonding" refer to "directly bonded to" or "bonded to via one or more intermediate elements, members, or layers."

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more examples, alterations and/or modifications can be made to the illustrated examples without departing from the spirit and scope of the appended claims. In addition, while a particular feature of the present teachings may have been disclosed with respect to only one of several examples, such feature may be combined with one or more other features of the other examples as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

Clause 1: A method comprising receiving a first image; detecting a plurality of edges in the first image; connecting the edges; identifying a contour in the first image based at least partially upon the connected edges; determining a convex hull of the contour; and generating a second image comprising the convex hull.

Clause 2: The method of Clause 1, wherein the first image is captured by a camera on an aircraft in flight.

Clause 3: The method of Clause 1 or 2, wherein the edges are connected using morphological closing, and wherein the morphological closing uses a kernel having an area from about 2 pixels to about 200 pixels.

Clause 4: The method of any of Clauses 1-3, wherein the convex hull represents a portion of a ground region in the first image.

Clause 5: The method of Clause 4, wherein a plurality of first pixels in the second image represent the convex hull.

Clause 6: The method of Clause 5, wherein a plurality of second pixels in the second image do not represent the convex hull.

Clause 7: The method of Clause 6, wherein a portion of the second pixels represent a sky region in the first image.

Clause 8: The method of Clause 6 or 7, further comprising identifying a bottom-most first pixel in a column in the second image; and converting the second pixels that are below the bottom-most first pixel in the column to first pixels to produce a modified second image.

Clause 9: The method of Clause 8, further comprising steering the aircraft based at least partially upon the modified second image.

Clause 10: The method of Clause 8 or 9, further comprising detecting a second aircraft in flight based at least partially upon the modified second image.

Clause 11: A computing system comprising one or more processors; and a memory system comprising one or more non-transitory computer-readable media storing instructions that, when executed by at least one of the one or more processors, cause the computing system to perform operations, the operations comprising receiving a first image, wherein the first image is captured by a camera on an aircraft in flight; detecting a plurality of edges in the first image based at least partially upon a threshold; connecting the edges; identifying a largest contour in the first image based at least partially upon the connected edges; determining a convex hull of the largest contour, wherein the convex hull represents a portion of a ground region in the first image; and generating a second image comprising the convex hull, wherein a plurality of first pixels in the second image represent the convex hull, and wherein a plurality of second pixels in the second image do not represent the convex hull.

Clause 12: The computing system of Clause 11, wherein the edges are connected using morphological closing, and wherein the morphological closing uses a kernel having an area from about 10 pixels to about 100 pixels.

Clause 13: The computing system of Clause 11 or 12, wherein the operations further comprise identifying a bottom-most first pixel in each column in the second image; and converting the second pixels that are below the bottom-most first pixel in each column to first pixels to produce a modified second image, wherein the first pixels in the modified second image represent the ground region, and wherein the second pixels in the modified second image represent a sky region.

Clause 14: The computing system of Clause 13, wherein the operations further comprise combining at least a portion of the first image and at least a portion of the modified second image to produce a combined image.

Clause 15: The computing system of Clause 14, wherein the operations further comprise transmitting or displaying a notification to steer the aircraft based at least partially upon the combined image.

Clause 16: A computing system comprising one or more processors; and a memory system comprising one or more non-transitory computer-readable media storing instructions that, when executed by at least one of the one or more processors, cause the computing system to perform operations, the operations comprising receiving a first image, wherein the first image is captured by a camera on an aircraft in flight; detecting a plurality of edges in the first image based at least partially upon a threshold; connecting the edges, wherein the edges are connected using morphological closing with a square kernel, and wherein the morphological closing uses a kernel having an area from about 20 pixels to about 50 pixels; identifying a largest contour in the first image based at least partially upon the connected edges, wherein the largest contour comprises a largest area; determining a convex hull of the largest contour, wherein the convex hull represents a portion of a ground region in the first image; generating a second image comprising the convex hull, wherein a plurality of first pixels having a first color in the second image represent the convex hull, and wherein a plurality of second pixels having a second color in the second image do not represent the convex hull; identifying a bottom-most first pixel in each column in the second image; converting the second pixels that are below the bottom-most first pixel in each column to first pixels to produce a modified second image, wherein the first pixels in the modified second image represent the ground region, and wherein the second pixels in the modified second image represent a sky region; and combining at least a portion of the first image and at least a portion of the modified second image to produce a combined image.

Clause 17: The computing system of Clause 16, wherein combining at least a portion of the first image and at least a portion of the modified second image comprises overlaying a portion of the modified second image that corresponds to the ground region on the first image.

Clause 18: The computing system of Clause 17, wherein the modified second image is at least partially transparent when overlaid on the first image.

Clause 19: The computing system of any of Clauses 16-18, further comprising detecting a second aircraft in flight based at least partially upon the combined image.

Clause 20: The computing system of Clause 19, further comprising transmitting or displaying a notification to steer the aircraft based at least partially upon a trajectory of the second aircraft.

What is claimed is:

1. A method, comprising
receiving a first image, wherein the first image is captured by a camera on an aircraft in flight;
detecting a plurality of edges in the first image;
connecting the edges;
identifying a contour in the first image based at least partially upon the connected edges;
determining a convex hull of the contour; and
generating a second image comprising the convex hull.

2. The method of claim 1, wherein generating the second image comprises modifying the first image to generate the second image.

3. The method of claim 1, wherein the convex hull represents a portion of a ground region in the first image.

4. The method of claim 3, wherein a plurality of first pixels in the second image represent the convex hull.

5. The method of claim 4, wherein a plurality of second pixels in the second image do not represent the convex hull.

6. The method of claim 5, wherein a portion of the second pixels represent a sky region in the first image.

7. The method of claim 5, further comprising:
identifying a bottom-most first pixel in a column in the second image; and
converting the second pixels that are below the bottom-most first pixel in the column to first pixels to produce a modified second image.

8. The method of claim 7, further comprising navigating the aircraft based at least partially upon the modified second image.

9. The method of claim 7, further comprising detecting an object in space based at least partially upon the modified second image.

10. A computing system comprising:
one or more processors; and
a memory system comprising one or more non-transitory computer-readable media storing instructions that, when executed by at least one of the one or more processors, cause the computing system to perform operations, the operations comprising:
receiving a first image, wherein the first image is captured by a camera on an aircraft in flight;
detecting a plurality of edges in the first image based at least partially upon a threshold;
connecting the edges;
identifying a largest contour in the first image based at least partially upon the connected edges;
determining a convex hull of the largest contour, wherein the convex hull represents a portion of a ground region in the first image; and
generating a second image comprising the convex hull, wherein a plurality of first pixels in the second image represent the convex hull, and wherein a plurality of second pixels in the second image do not represent the convex hull.

11. The computing system of claim 10, wherein the edges are connected using morphological closing, and wherein the morphological closing uses a kernel having an area from 10 pixels to 100 pixels.

12. The computing system of claim 10, wherein the operations further comprise:
identifying a bottom-most first pixel in each column in the second image; and
converting the second pixels that are below the bottom-most first pixel in each column to first pixels to produce a modified second image, wherein the first pixels in the modified second image represent the ground region, and wherein the second pixels in the modified second image represent a sky region.

13. The computing system of claim 12, wherein the operations further comprise combining at least a portion of the first image and at least a portion of the modified second image to produce a combined image.

14. The computing system of claim 13, wherein the operations further comprise causing the aircraft to navigate based at least partially upon the combined image.

15. A computing system comprising:
one or more processors; and
a memory system comprising one or more non-transitory computer-readable media storing instructions that, when executed by at least one of the one or more processors, cause the computing system to perform operations, the operations comprising:
receiving a first image, wherein the first image is captured by a camera on a vehicle;
detecting a plurality of edges in the first image based at least partially upon a threshold;
connecting the edges, wherein the edges are connected using morphological closing with a square kernel, and wherein the morphological closing uses a kernel having an area from 20 pixels to 50 pixels;
identifying a largest contour in the first image based at least partially upon the connected edges, wherein the largest contour comprises a largest area;
determining a convex hull of the largest contour, wherein the convex hull represents a portion of a ground region in the first image;
generating a second image comprising the convex hull, wherein a plurality of first pixels having a first color in the second image represent the convex hull, and wherein a plurality of second pixels having a second color in the second image do not represent the convex hull;
identifying a bottom-most first pixel in each column in the second image;
converting the second pixels that are below the bottom-most first pixel in each column to first pixels to produce a modified second image, wherein the first pixels in the modified second image represent the ground region, and wherein the second pixels in the modified second image represent a sky region; and
combining at least a portion of the first image and at least a portion of the modified second image to produce a combined image.

16. The computing system of claim 15, wherein combining at least a portion of the first image and at least a portion of the modified second image comprises overlaying a portion of the modified second image that corresponds to the ground region on the first image.

17. The computing system of claim 16, wherein the modified second image is at least partially transparent when overlaid on the first image.

18. The computing system of claim 15, further comprising detecting an object based at least partially upon the combined image.

19. The computing system of claim 18, further comprising causing the vehicle to navigate based at least partially upon a trajectory of the object.

* * * * *